T. L. WILLSON.
CALCIUM CARBIDE PROCESS.
No. 11,511. Reissued Oct. 22, 1895.
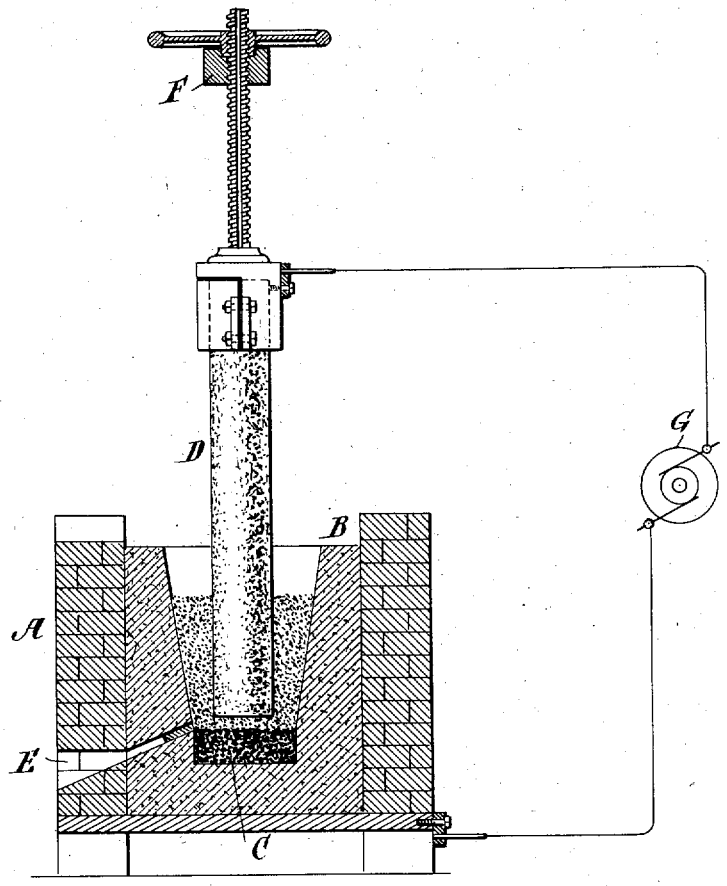
Witnesses
Geo. Wadman.
H. Coutant.
Inventor
Thomas L. Willson
By his attorney
Edward M. Dickerson

UNITED STATES PATENT OFFICE.

THOMAS L. WILLSON, OF NEW YORK, N. Y.

CALCIUM-CARBIDE PROCESS.

SPECIFICATION forming part of Reissued Letters Patent No. 11,511, dated October 22, 1895.

Original No. 541,137, dated June 18, 1895. Application for reissue filed September 26, 1895. Serial No. 563,803.

*To all whom it may concern:*

Be it known that I, THOMAS L. WILLSON, of the city, county, and State of New York, have invented a new and useful Improvement in Calcium-Carbide Processes, of which the following is a full, true, and exact description, reference being had to the accompanying drawing.

This invention relates to an improved process of producing calcium carbide.

In carrying out my process I proceed as follows: I take very-finely-divided coke and lime, mechanically reduced to a pulverulent condition, and I mingle them thoroughly mechanically in the proportion of thirty-five per cent. of coke and sixty-five per cent. of lime. I then subject them to the action of the electric current in a furnace such as that shown in the accompanying drawing, which is a vertical section, and in which—

A represents an inclosing brickwork; B, an internal lining, preferably of carbon, which, though preferable, is not in all cases necessary; C, one of the conducting-poles, by preference of broken carbon; D, a removable pole of compacted carbon; E, a taphole for removing the melted product, if desired; F, adjusting mechanism for raising the carbon pole D; and G, an alternating-current dynamo, which may therefore be made commutatorless.

In starting this furnace the carbon pole D and the conducting-bodies C are connected to the poles of an alternating-current dynamo having a mean potential, say, of fifty-five volts and sufficient ampèrage to produce the amount of material required, having regard to the size of the furnace. Using, for instance, a pole having eight inches on the side, an ampèrage of about fifteen hundred is desirable. Under these conditions, by reason of the alternation of the current, a feeding in of the mingled lime and carbon between the poles is effected to an extent which does not occur when a direct current is used. Furthermore, it has been generally understood that the production of calcium carbide was due to an electrolytic action and not due to a smelting action. I have demonstrated that the action is purely a smelting action under the conditions of the process herein described; furthermore, that the block of molten calcium carbide which forms beneath the elevating-pole is itself a good conductor of electricity, and can be built up from the bottom to any desired height without preventing the operation of the process. A height, for instance, of two or more feet is entirely practicable in the apparatus above described. If preferred, of course, the fused calcium carbide may be tapped out as the same is formed in the ordinary way as applied to iron and steel. The liquid calcium carbide thus produced, when allowed to cool, crystallizes into the form above described, and when broken exhibits the irridescent surfaces above named. By this process, likewise, the yield of calcium carbide per electric horse-power is almost doubled over a process of using a direct current, which is evidently a matter of the utmost importance, while at the same time the process proceeds uniformly and without break by reason of the substantial uniform feeding in of the material.

It is essential, in order to produce the new material herein described, to have the lime and coke very finely divided. This is done by a powdering-machine, and then the powdered lime and coke are thoroughly mingled by a grinder or mixer, so as to bring these bodies into most intimate contact. The action of the alternating current is likewise essentially different from that of a direct current, producing a series of explosives, the effect of which seems to be to feed the pulverized material into the arc. This is very important in accomplishing a rapid and uniform conversion.

The reversals of the current may be satisfactorily run at about fifty a second, and the serious difficulty of feeding in between the poles is overcome by this process.

I do not in this application claim the application of an alternating current in combination with mingled carbon to other metallic oxides, having made application therefor on the 20th day of February, 1895, Serial No. 539,143.

I do not in this application claim the new product thereby produced, having made application therefor on the 4th day of March, 1895, Serial No. 540,456.

What I claim as my invention, and desire to secure by Letters Patent, is—

The process herein described, which consists in feeding in to the interspace between two electric poles pulverulent and thoroughly commingled carbon and lime by means of an alternating current of electricity, and of subsequently converting the same into calcium carbide by means of the electric arc formed between said poles, substantially as described.

In testimony whereof I have signed my name to this specification in the presence of two subscribing witnesses.

THOMAS L. WILLSON.

Witnesses:
H. CANTANT,
ANTHONY GREF.